March 26, 1968  J. A. ALICH  3,374,816
BANDSAW GUIDE

Filed Oct. 20, 1965  2 Sheets-Sheet 1

INVENTOR.
JOHN A. ALICH
BY
Schapp & Hatch
ATTORNEYS

March 26, 1968  J. A. ALICH  3,374,816
BANDSAW GUIDE

Filed Oct. 20, 1965  2 Sheets-Sheet 2

INVENTOR.
JOHN A. ALICH
BY Schapp & Hatch
ATTORNEYS

United States Patent Office 3,374,816
Patented Mar. 26, 1968

3,374,816
BANDSAW GUIDE
John A. Alich, Burlingame, Calif., assignor, by mesne assignments, to The P. B. Yates Machine Company Limited, Hamilton, Ontario, Canada, a company of British Columbia
Filed Oct. 20, 1965, Ser. No. 498,286
14 Claims. (Cl. 143—160)

ABSTRACT OF THE DISCLOSURE

A bandsaw guide constructed for rapid movement between a guide position and a retracted position with the retraction being accomplished by powered driving means suitably controlled by a structure for switching the power to the power drive means so as to drive the guide between the two positions as desired; the preferred guide structure being mounted on a suitable base and having a fixed guide member and a retractable guide member slideably mounted and connected to a fluid cylinder serving as the power driving means, and control for the fluid cylinder in the form of a switching valve for directing fluid power to the cylinder and actuating it to retract the guide member and return same.

---

This invention relates to a bandsaw guide and more particularly to a guide for the endless blade of a bandsaw unit of multi-band bandsaw apparatus.

Briefly, the invention contemplates a bandsaw guide comprising a support, a first guiding member secured to the support on one side of the bandsaw blade, a second guiding member located on the support on the other side of the bandsaw blade and mounted for movement toward and away from the bandsaw blade, driving means for moving the second guiding member toward and away from the blade between a retracted and an operative position, and control means for actuating the driving means in response to a signal.

Large multi-band saws which are used to make a plurality of cuts longitudinally through an elongated work piece, such as a log, conventionally include a plurality of individual bandsaw units each having an endless blade trained around two vertically aligned pulleys and adapted to make one of the cuts. The distance between the two pulleys of a unit may be several feet an it is necessary that guides be provided for the blade between the pulleys to insure proper alignment of the blade as well as to prevent the blade from bowing between the wheels. The guides are normally located above and below the workpiece being cut and conventionally consist of slotted blocks through which the blade passes and which are connected to the frame of the bandsaw unit. Sawdust and other wood chips emanating from the cut made by the blade tend to accumulate in the slot of the guide below the workpiece, and may become ignited due to friction with the blade if the slot is not cleaned out immediately.

Attempts have been made to remedy this situation by constructing the guides so that one side thereof is movable away from the blade to let the sawdust and other debris pass through the slot. These attempts, however, have not been wholly satisfactory because it was a difficult and time consuming process to retract the movable portion of the guide. Normally, it was necessary to stop the bandsaw apparatus, climb into the unit, and then manually retract the movable portion of the guide to permit the sawdust, chips and other debris to fall through the slot. It will be readily appreciated that with a crew of several men operating the multiple bandsaw apparatus, any "down time," such as would be occasioned by debris caught in conventional apparatus, is quite expensive.

Accordingly, one of the principle obects of this invention is the provision of a bandsaw guide adapted to be opened automatically in response to a signal to permit debris to fall through the guide, thereby eliminating a fire hazard.

Another object of this invention is the provision of a bandsaw guide of the class described which is adapted to be opened while the bandsaw apparatus is running, thus avoiding the necessity of shutting down the apparatus.

A further object of this invention is the provision of a bandsaw guide such as described which, in one embodiment, is particularly formed for shedding or diverting sawdust and other debris from the blade without opening the guide.

A still further object of this invention is the provision of a bandsaw guide of the class described which may be operated in response to a signal initiated by one of the workmen or by a signal automatically initiated by the movement of a workpiece through the bandsaw apparatus.

A further object of this invention is the provision of a guide of the class described which is adjustable so that the blade may be deflected from its normal path of travel, if desired.

Another object of this invention is the provision of a bandsaw guide such as described which is relatively simple and economical in construction, yet effective in operation.

Further objects and advantages of the invention will be apparent as the specification progresses, and the new and useful features of the bandsaw guide will be fully defined in the claims attached hereto.

In the accompanying drawings, in which several of various possible embodiments of the invention are illustrated, FIGURE 1 is a side view in elevation of a typical bandsaw unit of multiple bandsaw apparatus incorporating a guide of this invention;

Figure 1:
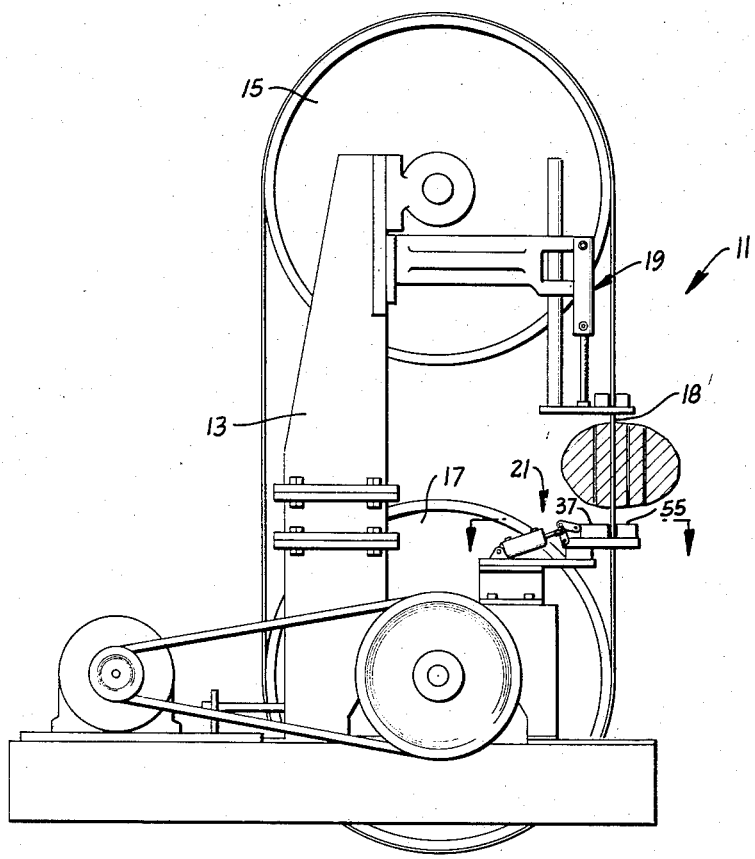

Referring now to the drawings, and particularly to FIGURE 1, one bandsaw unit of a multi-band bandsaw is illustrated at 11 and is shown to comprise a frame 13 having two wheels or pulleys 15 and 17 rotatably mounted thereon around which an endless blade 18 is trained. An upper vertically adjustable bandsaw guide is shown at 19 and a lower bandsaw guide is shown at 21 for guiding the blade as the latter cuts through a workpiece, such as a log 23. It will be understood that in a typical multi-band bandsaw, four bandsaw units 11 may be arranged relative to one another in such manner as to make four vertical and longitudinal cuts through the workpiece 23, such as that shown in my copending application Ser. No. 289,000 filed June 19, 1963, entitled Method and Apparatus for Multiple Resawing, now United States Patent No. 3,318,347.

The lower guide 21 is mounted on the frame 13 and includes an L-shaped support member 25 secured to the frame. A support block 27 is fastened to support member 25 and has a base 29 mounted thereon. Base 29 is generally channel-shaped in vertical cross-section and has a slot 31 therein through which the blade 18 passes.

A guiding member or shoe 33 is slidable on the base 29 on one side 34 of the blade 18 and includes a generally channel-shaped carrier 35 for carrying a plurality of guiding blocks 37 therein. Blocks 37 are preferably formed of phenolic and are held in carrier 35 by a pressure bolt 39 extending through a tapped hole 41 in one side of the carrier. The carrier 35 is held in sliding contact with the base 29 by means of a bolt 43 the shank 45 of which extends through a slot 47 in the carrier into a tapped hole 49 in the base 29. The bolt head is indicated at 50 and rides in a recess 51 in the carrier.

Another guiding member or shoe 52 is secured to the base 29 on the other side 54 of the blade. Shoe 53 includes a plurality of guiding blocks 55, similar to blocks 37, held between two posts 57 on base 29 by a pressure bolt 59.

Figure 3:
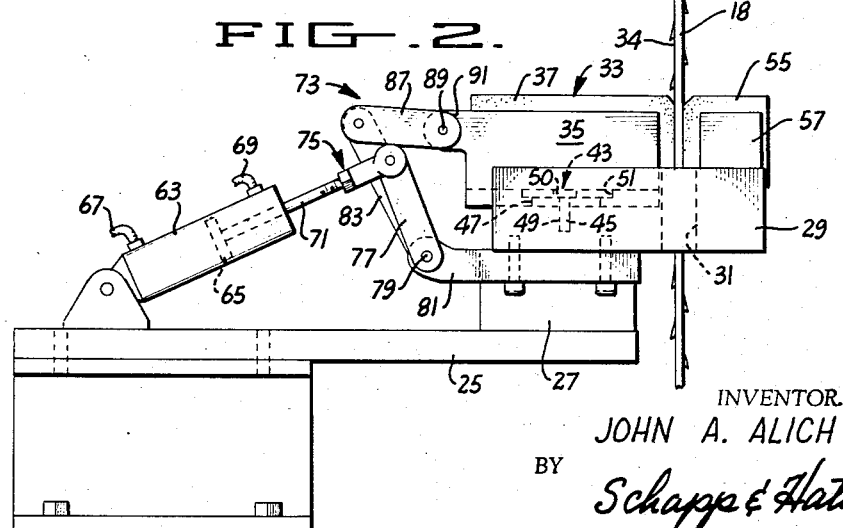
FIGURE 3 is a view in elevation of the guide shown in FIGURE 2.

The blocks 37 and 55 are so positioned that their faces are closer to the blade 18 than the edges of slot 31 (see FIGURE 3).

Figure 2:
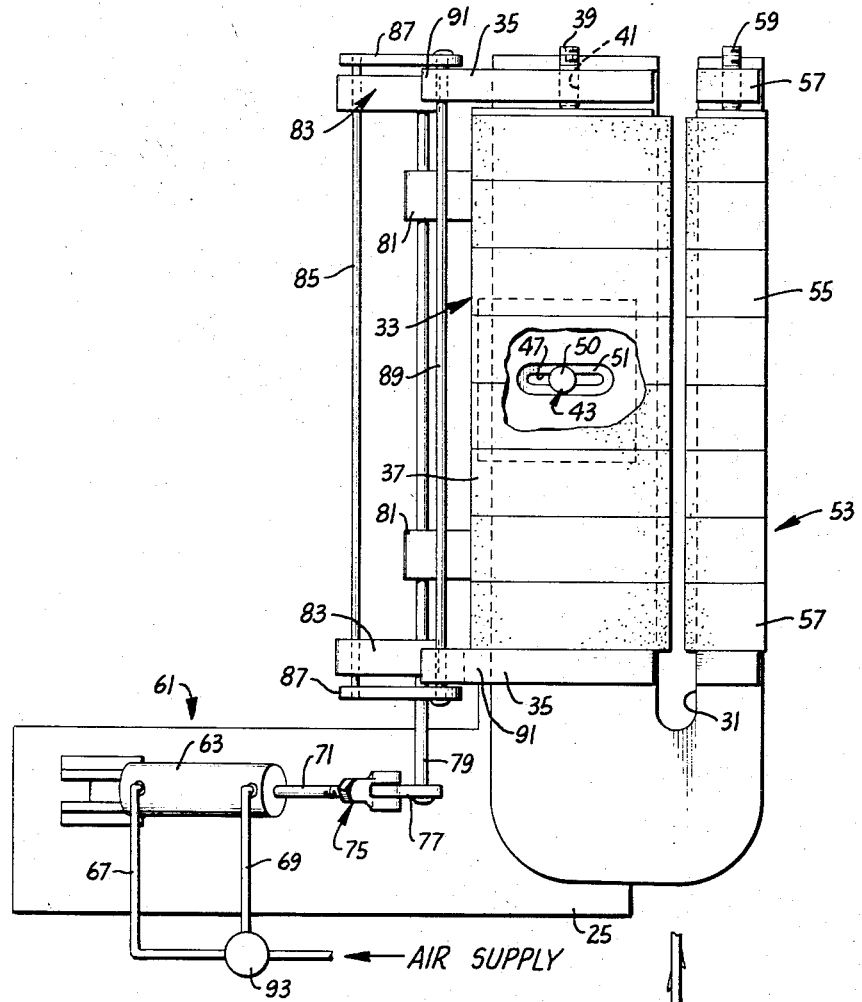
FIGURE 2 is an enlarged section taken along line 2—2 of FIGURE 1.

The carrier 35 is adapted to be moved between the operative position shown in FIGURES 2 and 3 and a retracted position by driving means generally indicated at 61. The driving means includes an air cylinder 63 connected to the support member 25 and having a piston or ram 65 movable therein by means of air forced through alternate delivery and exhaust pipes 67 and 69 in a well-known manner. The piston 65 is connected by a piston rod 71 to a linkage 73 which in turn is connected to carrier 35. Piston rod 71 is made extensible by the screw shackle or turnbuckle 75 so that the operative position of the guiding shoe 33 may be varied.

Linkage 73 includes a crank arm 77 secured to a shaft 79 rotatably supported by brackets 81 connected to base 29. A pair of links 83 is connected to shaft 79 and each link 83 is connected by an elongated pin 85 to a second pair of links 87. The links 87 are connected to the carrier 35 by a pin 89 extending through the links and a pair of rearwardly extending ears 91 on the carrier.

The air delivery and exhaust pipes 67 and 69 are connected to an air supply and are adapted to be controlled by a valve 93 operated upon a signal given by a workman or automatically operated upon a signal given as the result of a workpiece moving through the apparatus, such as by the actuation of a feeler (not shown) by a log moving through the apparatus.

Assuming that the delivery and exhaust pipes are under control of a valve operated by a workman, that the guide shoes 33 and 53 are in the position shown in FIGURES 1 and 2, and that sawdust, wood chips or other debris become wedged between the blade and the guide shoes, operation of the apparatus is as follows:

First, the workman, upon detecting the presence of the wedged debris, actuates the control valve 93 to cause the piston 65 to be driven toward the lower end of the cylinder 63. This causes the links 83 to swing counter-clockwise as viewed in FIGURE 3, thereby pulling the guide shoe 33 away from the blade 18 and allowing the debris to fall through the slot 31 or be driven through the slot by the blade. Since the blade 18 is free to be deflected to the left as viewed in FIGURE 3, any debris caught between the blade and guide shoe 53 will force the blade to the left and be forced by the blade through slot 31. After the debris has passed through the slot, the control valve 93 is actuated to drive the linkage 73 and guide shoe 33 back to its operative position. It will thus be seen that the debris can be quickly and automatically removed from between the blade and the guide shoes without shutting down the apparatus and without the danger of a fire starting.

It is sometimes desired to have the blade 18 deflected slightly from its tangential path relative to the pulleys 15 and 17 so that the blade is maintained in an absolutely taut condition and is prevented from running out of the desired cutting plane. The blade may be deflected slightly by first removing the guide blocks 55 and then adjusting turnbuckle 75 so that guide shoe 33 is moved to the right, as viewed in FIGURE 3, the desired amount to deflect the blade. In this regard, the upper bandsaw guide 19 may be constructed in the same manner as the lower guide 21 and both of the guides adjusted so that the blade will be deflected slightly to the right as viewed in FIGURES 1 and 3 while remaining vertical.

Figure 4:
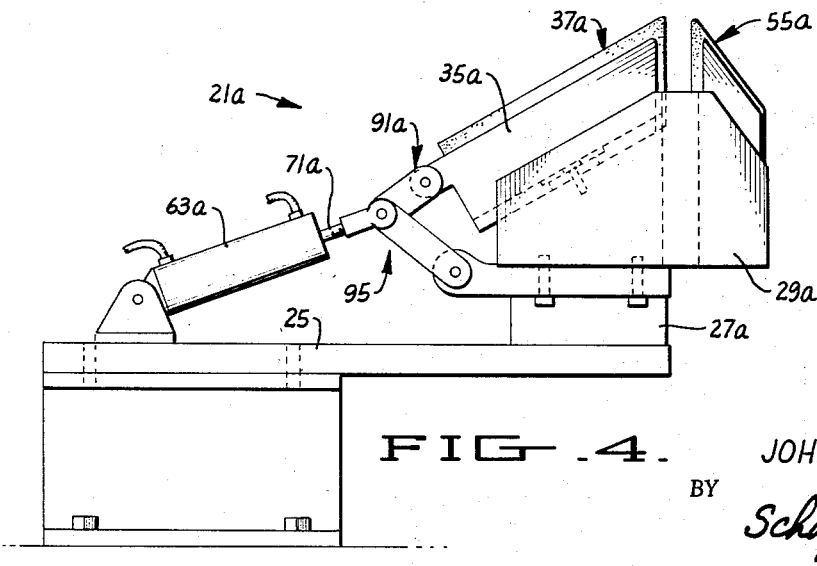
FIGURE 4 is a view similar to FIGURE 3 illustrating a modification of the invention.

An alternate form of bandsaw guide is shown at 21a in FIGURE 4 and includes a support 25a, block 27a and base 29a. A carrier 35a carrying blocks 37a is mounted for sliding modement on base 29a in the same manner as carrier 35 is mounted on base 29. A toggle linkage 95 is connected between brackets 81a and ears 91a on carrier 35a and is adapted to be actuated by the piston rod 71a of the air cylinder device 63a. The guide blocks 37a and 55a are similar to blocks 37 and 55 except that, due to the inclination of the carrier 35a, the blocks are of slightly different shape. The inclination of the blocks is particularly advantageous because sawdust and other debris dropping downward after the cut is made tend to be diverted away from the area between the blade and the guide blocks, thereby reducing the possibility of being caught between the blade and the guide blocks. The carrier 35a is reciprocated back and forth toward the blade in the same manner as carrier 35. Similarly, the location of the operative position of the carrier 35a may be varied in the same manner and for the same purposes as carrier 35.

In view of the foregoing, it will be seen that the present invention allows sawdust and other debris to be cleared from the guides quickly and automatically without stopping the saw. Moreover, the invention is adapted to permit the deflection of the blade, if desired.

As various changes could be made in the above constructions without departing from the scope of the invention, it is intended that all matter contained in the above description or shown in the accompanying drawings shall be interpreted as illustrative and not in a limiting sense.

I claim:

1. A bandsaw guide comprising support means, a first guiding member secured to said support means on one side of the bandsaw blade, a second guiding member located on said support means on the other side of the bandsaw blade and mounted for movement toward and away from the bandsaw blade, said second guiding member being mounted for quick movement between an operative guide position and a retracted position, powered driving means for rapidly moving said second guiding member toward and away from said bandsaw blade between the retracted position and the operative guide position, and control means for actuating said powered driving means.

2. A bandsaw guide as set forth in claim 1 wherein said powered driving means comprises a cylinder, a piston in said cylinder, means connecting said piston to said second guiding member, and means for introducing fluid into said cylinder on opposite sides of said piston for moving the latter and the second guiding member.

3. A bandsaw guide as set forth in claim 1 further comprising adjusting means for varying the operative guide position of the second guiding member.

4. A bandsaw guide as set forth in claim 1 wherein said support means includes a base, said second guiding member is mounted for sliding movement on said base and holding means are provided for holding said second guiding member in sliding contact with said base.

5. A bandsaw guide as set forth in claim 4 wherein said second guiding member is inclined toward the bandsaw blade to facilitate removal of wood pieces from the blade.

6. A bandsaw guide as set forth in claim 4 wherein said driving means includes a fluid-operated ram, and linkage means extending between said ram and said second guiding member for sliding the latter upon movement of said ram.

7. A bandsaw guide as set forth in claim 6 wherein said linkage means includes adjusting means for varying the location of the operative position of the second guiding member.

8. A bandsaw guide as set forth in claim 7 wherein the second guide member comprises a carrier and a plurality of phenolic blocks mounted on said carrier.

9. In an apparatus comprising a plurality of bandsaw units positioned for making multiple cuts lengthwise through an elongated workpiece, with each bandsaw unit having an endless blade; in combination, a guide for each blade comprising a support mounted on said unit, a first guide shoe secured to said support on one side of said blade, a second guide shoe slidably mounted on said support on the other side of said blade and adapted for rapid movement between an operative position adjacent said blade and a retracted position away from said band blade, powered driving means for moving said second guide shoe from one of said positions to the other, and control means for switching the power to said powered drive means to effect rapid movement from one of said positions to the other of said positions.

10. Apparatus as set forth in claim 9 wherein said support includes a channel-shaped base, said second guide shoe riding in said base and including a channel-shaped carrier having a plurality of guide blocks removably mounted therein.

11. Apparatus as set forth in claim 10, including means for holding said channel-shaped carrier in sliding engagement with said channel-shaped base and comprising a bolt having an elongated shank and an enlarged head, said head being located in a recess in said carrier, and said shank extending through a slot in said carrier into a hole in said base.

12. Apparatus as set forth in claim 11 wherein said second guide shoe slopes downwardly away from said blade to facilitate removal of wood chips from the blade.

13. Apparatus as set forth in claim 11 wherein said driving means includes adjusting means for varying the location of the operative position of said second guide shoe.

14. Apparatus as set forth in claim 13 wherein said second guide shoe slopes downwardly away from said blade to facilitate removal of wood chips from the blade.

References Cited

UNITED STATES PATENTS

| | | | |
|---|---|---|---|
| 390,083 | 9/1888 | Kettenring | 143—22 |
| 567,319 | 9/1896 | Mershon | 143—160 |
| 797,018 | 8/1905 | Presscott | 143—166 |
| 2,934,106 | 4/1960 | Chapman et al. | 143—160 |

DONALD R. SCHRAN, *Primary Examiner.*